(12) United States Patent
Gomezcaballero et al.

(10) Patent No.: US 10,657,670 B2
(45) Date of Patent: May 19, 2020

(54) INFORMATION PROCESSING APPARATUS

(71) Applicant: Hitachi Automotive Systems, Ltd., Hitachinaka-shi, Ibaraki (JP)

(72) Inventors: Felipe Gomezcaballero, Tokyo (JP); Shinichi Nonaka, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 42 days.

(21) Appl. No.: 16/069,784

(22) PCT Filed: Jan. 12, 2017

(86) PCT No.: PCT/JP2017/000705
§ 371 (c)(1),
(2) Date: Jul. 12, 2018

(87) PCT Pub. No.: WO2017/145543
PCT Pub. Date: Aug. 31, 2017

(65) Prior Publication Data
US 2019/0026918 A1 Jan. 24, 2019

(30) Foreign Application Priority Data
Feb. 22, 2016 (JP) .................... 2016-031191

(51) Int. Cl.
*G06T 7/73* (2017.01)
*G06T 1/00* (2006.01)
(Continued)

(52) U.S. Cl.
CPC ............ *G06T 7/73* (2017.01); *G06K 9/00805* (2013.01); *G06T 1/00* (2013.01); *G08G 1/04* (2013.01);
(Continued)

(58) Field of Classification Search
CPC combination set(s) only.
See application file for complete search history.

(56) References Cited

U.S. PATENT DOCUMENTS 6,218,960 B1 4/2001 Ishikawa et al.
9,423,267 B2* 8/2016 Tomizawa ............ G01C 21/365
(Continued)

FOREIGN PATENT DOCUMENTS

EP 2 535 861 A1 12/2012
JP 7-83692 A 3/1995
(Continued)

OTHER PUBLICATIONS

Japanese-language Office Action issued in counterpart Japanese Application No. 2016-031191 dated Sep. 3, 2019 with English translation (six (6) pages).
(Continued)

*Primary Examiner* — Asghar H Bilgrami
(74) *Attorney, Agent, or Firm* — Crowell & Moring LLP

(57) ABSTRACT

The present invention provides an information processing apparatus that is capable of suitably and efficiently monitoring both near and far regions, reducing the non-recognition rates of objects in both the near and far regions, and thus improving traveling safety, and that is suitably used as, for example, a periphery recognition apparatus mounted on a vehicle that accomplishes automatic driving. According to the present invention, an allocated resource changing unit allocates to a far object recognition unit a resource of which size is determined depending on the priority assigned thereto, even when the priority of a near object recognition process performed on a near region is higher than the priority of a far object recognition process performed on a far region.

10 Claims, 13 Drawing Sheets

(51) Int. Cl.
  *G08G 1/16* (2006.01)
  *G08G 1/04* (2006.01)
  *G06K 9/00* (2006.01)
  *H04N 13/204* (2018.01)

(52) U.S. Cl.
  CPC ............ *G08G 1/16* (2013.01); *H04N 13/204* (2018.05); *G06T 2207/30261* (2013.01)

(56) References Cited

U.S. PATENT DOCUMENTS

| | | | |
|---|---|---|---|
| 2010/0073503 A1 | 3/2010 | Tanaka et al. | |
| 2011/0123961 A1* | 5/2011 | Staplin | G09B 9/052 434/64 |
| 2012/0307062 A1 | 12/2012 | Ishikawa et al. | |
| 2016/0167514 A1* | 6/2016 | Nishizaki | B60K 35/00 345/7 |
| 2016/0170487 A1* | 6/2016 | Saisho | G01C 21/3635 345/156 |
| 2016/0335782 A1* | 11/2016 | Sundaresan | G06T 15/506 |

FOREIGN PATENT DOCUMENTS

| | | |
|---|---|---|
| JP | 11-39596 A | 2/1999 |
| JP | 11-312300 A | 11/1999 |
| JP | 2000-251080 A | 9/2000 |
| JP | 2008-282153 A | 11/2008 |
| JP | 2011-164982 | 8/2011 |
| JP | 2014-153167 A | 8/2014 |

OTHER PUBLICATIONS

International Search Report (PCT/ISA/210) issued in PCT Application No. PCT/JP2017/000705 dated May 17, 2017 with English translation (four (4) pages).
Japanese-language Written Opinion (PCT/ISA/237) issued in PCT Application No. PCT/JP2017/000705 dated May 17, 2017 (four (4) pages).
Extended European Search Report issued in counterpart European Application No. 17755985.3 dated Sep. 20, 2019 (11 pages).
Rovira-Mas F. et al., "Bifocal Stereoscopic Vision for Intelligent Vehicles", International Journal of Vehicular Technology, Jan. 1, 2009, pp. 1-9, vol. 2009, Article ID 123231, Hindawi Publishing Corporation, XP008127485 (nine (9) pages).
Japanese-language Office Action issued in counterpart Japanese Application No. 2016-031191 dated Jan. 14, 2020 with English translation (eight (8) pages).

* cited by examiner

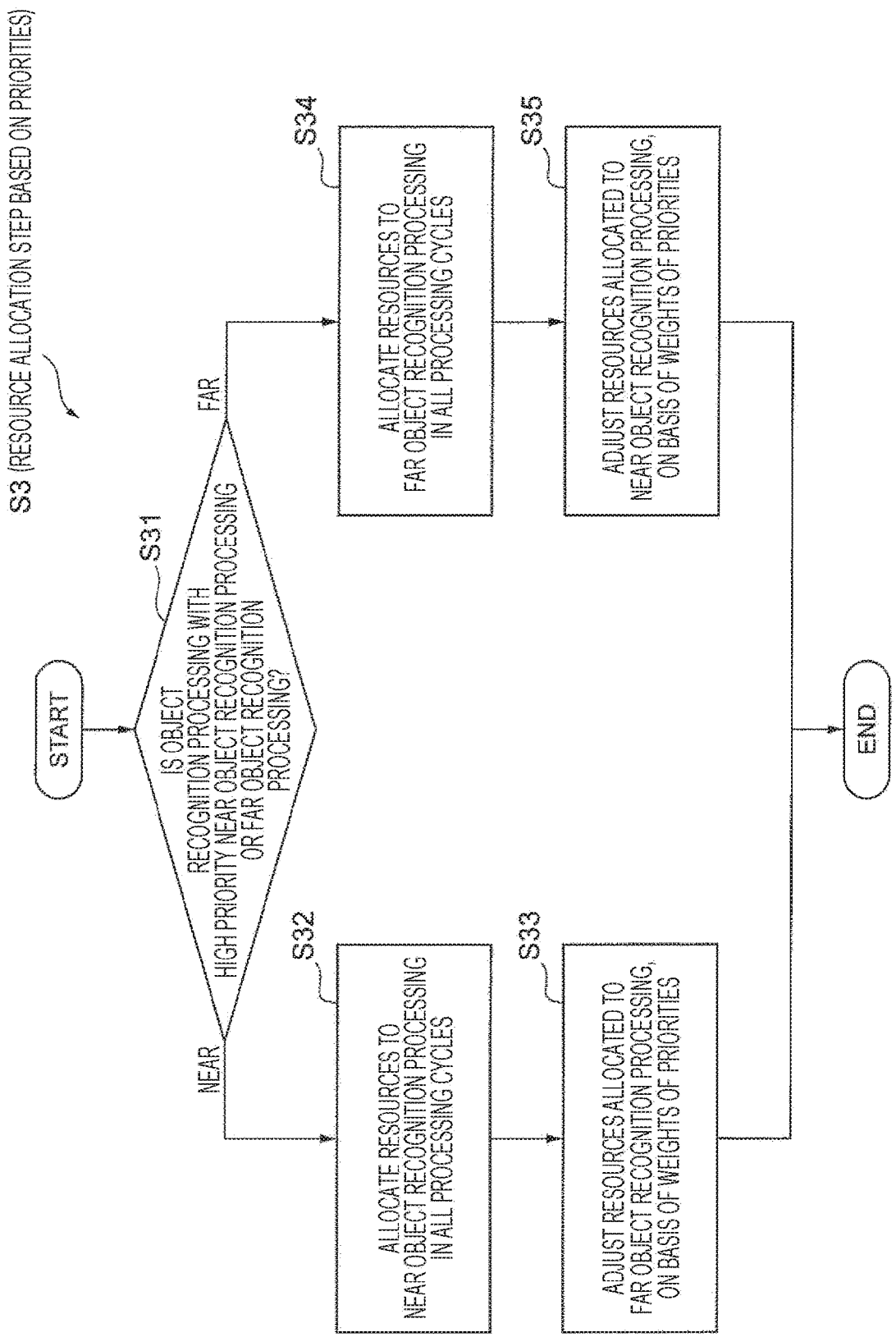

INFORMATION PROCESSING APPARATUS

TECHNICAL FIELD

The present invention relates to an information processing apparatus and particularly, to an information processing apparatus that is suitably used as a periphery recognition apparatus mounted on a sensor unit for far detection and a sensor unit for wide-angle near detection.

BACKGROUND ART

Recently, an image processing apparatus that detects a solid object (three-dimensional object) using a stereo camera is used.

The image processing apparatus is used in applications for a monitoring system for detecting invasion of suspicious persons and other abnormalities and an in-vehicle system for supporting safe driving of a vehicle.

In an in-vehicle environment, to satisfy requirements of applications for detecting surrounding vehicles, pedestrians, and objects, for example, it is necessary to previously find a method of realizing object detection and distance measurement and safely steering a vehicle.

As conventional technology of this kind of image processing apparatus, PTL 1 discloses a vehicle rear-side monitoring apparatus that includes an imaging unit mounted on a vehicle, imaging a road on the rear side of the vehicle, and obtaining a road image at every constant time; and a detection unit processing the road image obtained by the imaging unit and detecting other following vehicle, wherein the imaging unit is composed of a wide-angle high resolution camera, the detection unit has a first image processing unit for processing the entire road image obtained by the imaging unit by thinning image information; a second image processing unit for processing a partial region of the road image obtained by the imaging unit without thinning the image information; and a selection unit for selecting one of the first image processing unit and the second image processing unit, according to a traffic situation where other following vehicle is detected, and the vehicle rear-side monitoring apparatus monitors a relative relation between other following vehicle detected by the detection unit and an own vehicle. According to the vehicle rear-side monitoring apparatus disclosed in PTL 1, a wide range from the near side to the far side can be monitored in a preferable state. As a result, it is possible to precisely monitor other following vehicle.

CITATION LIST

Patent Literature

PTL 1: JP 2000-251080 A

SUMMARY OF INVENTION

Technical Problem

Incidentally, in recent years, development of automatic driving technology for monitoring the front side of the own vehicle in addition to the rear side of the own vehicle described in the conventional technology, monitoring an object around the own vehicle, recognizing a type of the detected object, and steering the vehicle safely and automatically according to a peripheral situation is under way. In the automatic driving technology, it is necessary to suitably detect and recognize a target object such as the vehicle around the own vehicle, regardless of an environment (traffic situation) in which the vehicle travels.

However, according to the conventional technology described in PTL 1, one of the first image processing unit and the second image processing unit is selected according to the traffic situation where other following vehicle is detected. Specifically, when other vehicle is detected in the vicinity of the own vehicle, the first image processing unit for processing the entire road image (wide-angle image) by thinning the image information is selected, when other vehicle is not detected in the vicinity of the own vehicle, the second image processing unit for processing the partial region (narrow-angle image) of the road image without thinning the image information is selected, and when the second image processing unit is selected, the first image processing unit is selected at a low frequency. As a result, the wide range from the near side to the far side is monitored in a preferable state. Therefore, for example, when other vehicle is detected in the vicinity of the own vehicle, a non-recognition rate (probability of being not recognized) of an object that may appear in a region (here, a relatively far region) not monitored at that time increases and traveling safety may be lowered.

The present invention has been made in view of the above problem and an object thereof is to provide an information processing apparatus that is capable of suitably and efficiently monitoring both near and far regions, reducing non-recognition rates of objects in both the near and far regions, and thus improving traveling safety and that is suitably used as, for example, a periphery recognition apparatus mounted on a vehicle that accomplishes automatic driving.

Solution to Problem

To solve the above problem, an information processing apparatus according to the present invention includes a far information acquisition unit which acquires far information regarding a far region; a near information acquisition unit which acquires near information regarding a near region; a far information processing unit which performs far information Processing using the far information; a near information processing unit which performs near information processing using the near information; and an allocated resource changing unit which changes the magnitudes of resources allocated to the far information processing unit and the near information processing unit, according to priorities of the far information processing and the near information processing. The allocated resource changing unit allocates the resources of the magnitudes determined according to the priority to the far information processing unit, even when the priority of the near information processing is higher than the priority of the far information processing.

In a more specific aspect, an information processing apparatus according to the present invention includes a far information acquisition unit which acquires far information regarding a far region; a near information acquisition unit which acquires near information regarding a near region; a far object recognition unit which performs object recognition processing of an object existing in the far region using the far information; a near object recognition unit which performs object recognition processing of an object existing in the near region using the near information; and an allocated resource changing unit which changes the magnitudes of resources allocated to the far object recognition unit and the near object recognition unit, according to priorities of far object recognition processing of the far region and near object recognition processing of the near region. The allocated resource changing unit allocates the resources of the magnitudes determined according to the priority to the far object recognition unit, even when the priority of the near object recognition processing of the near region is higher than the priority of the far object recognition processing of the far region.

Advantageous Effects of Invention

According to an information processing apparatus according to the present invention, even when a priority of near information processing (near object recognition processing) is higher than a priority of far information processing (near object recognition processing), an allocated resource changing unit allocates resources of the magnitudes determined according to the priority to a far information processing unit (far object recognition unit). Therefore, both near and far regions can be monitored suitably and efficiently and non-recognition rates of objects in both the near and far regions can be reduced. As a result, traveling safety can be improved.

Other problems, configurations, and effects will be apparent from the following description of embodiments.

BRIEF DESCRIPTION OF DRAWINGS

FIG. 3A is an overhead view thereof, and FIG. 3B is a diagram showing a front scene of the vehicle.

FIG. 6 is a flowchart illustrating processing executed in a resource allocation step shown in FIG. 4.

FIG. 7A is a diagram showing a situation where the vehicle is a little before the intersection, and FIG. 7B is a diagram showing a situation where the vehicle approaches the intersection and turns right.

FIG. 8A is a diagram showing a situation where the vehicle is a little before the junction, and FIG. 8B is a diagram showing a situation where the vehicle approaches the junction.

FIG. 9A is a diagram showing a situation before the vehicle joins the expressway, and FIG. 9B is a diagram showing a situation after the vehicle joins the expressway.

DESCRIPTION OF EMBODIMENTS

Embodiments of an information processing apparatus according to the present invention will be described below with reference to the drawings.

Hereinafter, the case where a camera suitable for far detection and a camera suitable for wide-angle near detection form a pair and an in-vehicle stereo camera device is configured will be described. However, a first sensor unit (far information acquisition unit) suitable for far detection and a second sensor unit (near information acquisition unit) suitable for wide-angle near detection may be configured using other sensors such as a radar and an ultrasonic sensor, for example. In addition, monocular cameras may be used as the first sensor unit (far information acquisition unit) and the second sensor unit (near information acquisition unit), images suitable for far information processing (far object recognition processing) and near information processing (near object recognition processing) may be generated from images photographed by the monocular cameras, and far information regarding a far region and near information regarding a near region may be acquired from the images.

Hereinafter, the case where a far detection camera and a wide-angle near detection camera are disposed toward the front to photograph the front side of a vehicle on which an information processing apparatus is mounted and monitor the front side (region) of an own vehicle, to detect and recognize an object approaching the vehicle, will be described. However, it is obvious that the present invention can also be applied to the case of monitoring the rear side or the side of the own vehicle.

Figure 1:
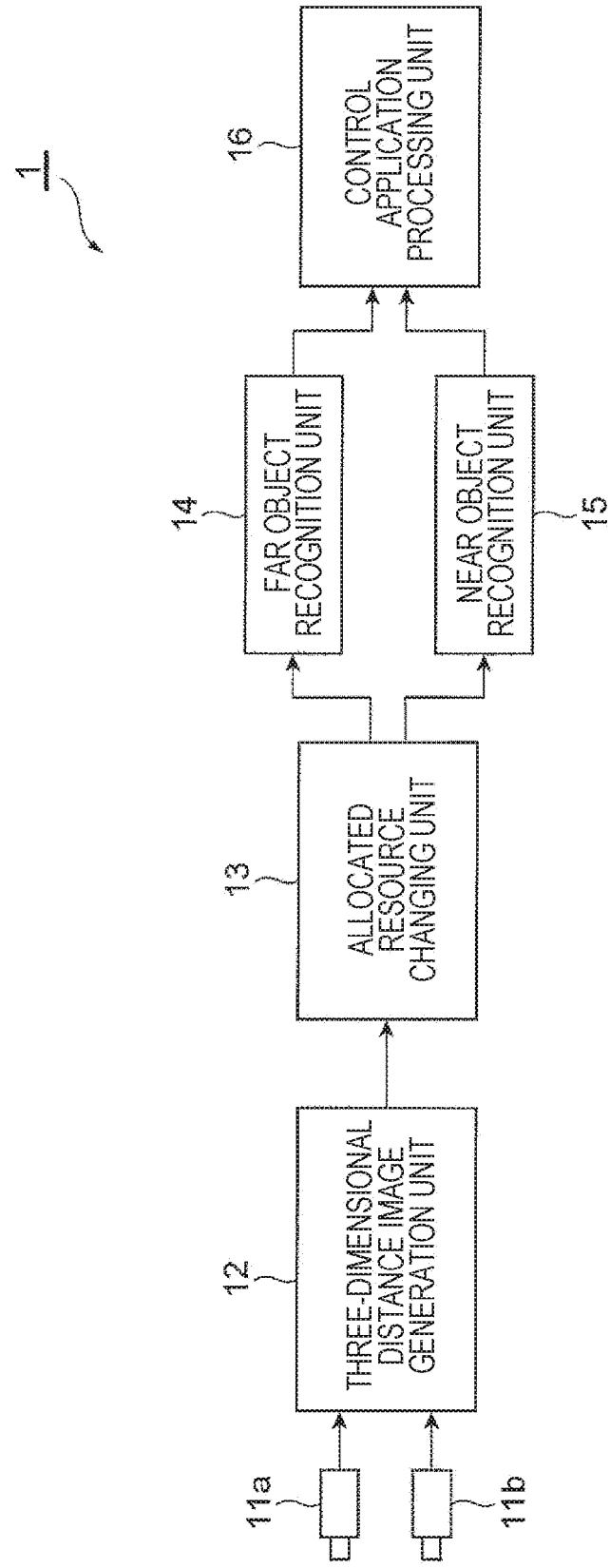
FIG. 1 is a block diagram showing an internal configuration of an embodiment of an information processing apparatus according to the present invention.

FIG. 1 is a block diagram showing an internal configuration of an embodiment of an information processing apparatus according to the present invention.

An information processing apparatus according to the embodiment shown in the drawings is used as a peripheral recognition apparatus for recognizing objects (a vehicle, a pedestrian, an obstacle, and the like) around an own vehicle, for example, and includes two cameras (a far information acquisition unit and a near information acquisition unit) 11a and 11b basically installed at same height, a three-dimensional distance image generation unit 12, an allocated resource changing unit 13, a far object recognition unit (far information processing unit) 14, a near object recognition unit (near information processing unit) 15, and a control application processing unit 16.

The two cameras 11a and 11b are disposed at approximately the same positions of the vehicle toward the front side of the vehicle. The camera 11a is suitable for far detection (that is, the camera 11a can acquire far information regarding a far region such as an object existing in the far region, with high precision) and the camera 11b is suitable for wide-angle near detection (that is, the camera 11b has a wide-angle visual field as compared with the camera 11a and can acquire near information regarding a wide-angle near region such as an object existing in the wide-angle near region, with high precision) (refer to FIG. 2).

The three-dimensional distance image generation unit 12 functions as a three-dimensional data generation unit that calculates three-dimensional long-distance data on the basis of situation data obtained by the camera 11a and calculates three-dimensional wide-angle short-distance data on the basis of situation data obtained by the camera 11b.

Figure 3A:
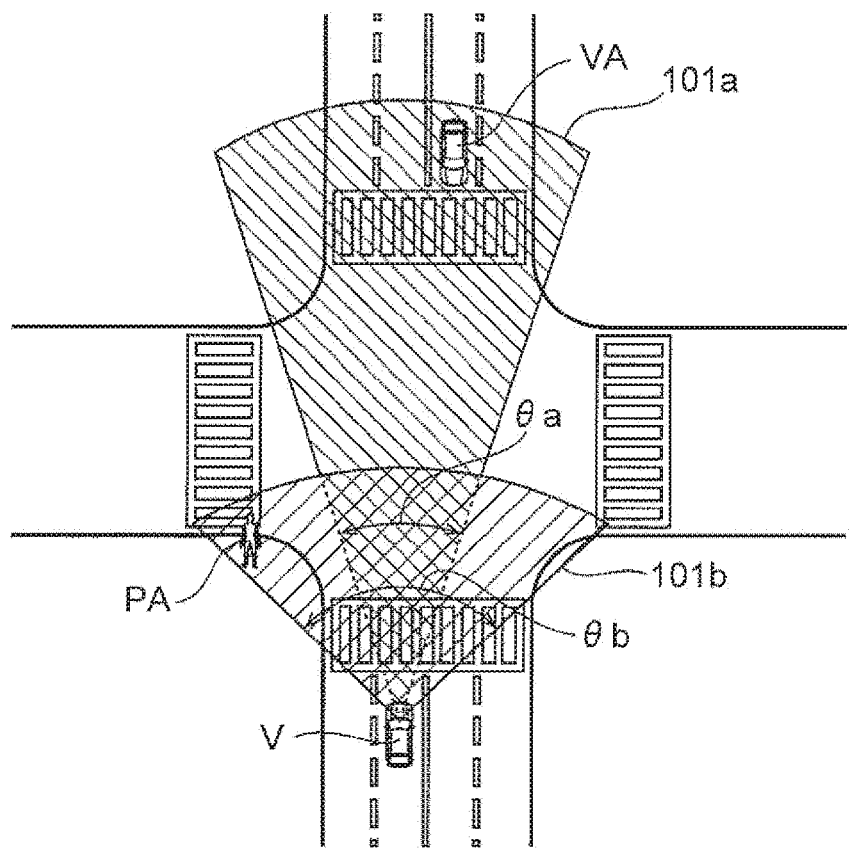
FIGS. 3A and 3B are diagrams showing a situation where a vehicle equipped with the information processing apparatus shown in FIG. 1 is in the vicinity of an intersection.
Figure 3B:
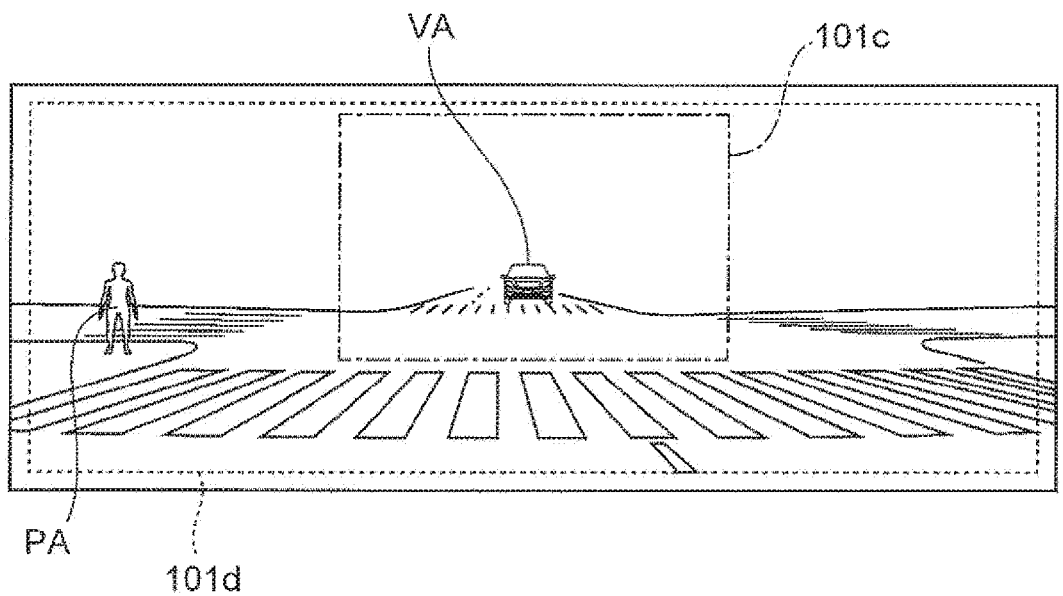

Specifically, the three-dimensional distance image generation unit 12 performs stereo matching using image signals received from the individual cameras 11a and 11b and generates a three-dimensional distance image for a long distance pertaining to a region 101c shown in FIG. 3(B) and a three-dimensional distance image for a wide-angle short distance pertaining to a region 101d shown in FIG. 3(B). In the stereo matching, a unit image in which a difference between image signals is minimized is determined for a predetermined unit image in each of the two images compared with each other. That is, a region where the same target object is displayed is detected. As a result, the three-dimensional distance image for the long distance and the three-dimensional distance image for the wide-angle short distance are configured. The three-dimensional distance image is an image having a value of the distance from the cameras to the target object in a real environment. In addition, the three-dimensional distance image generation unit 12 generates an image (long-distance image) for the long distance pertaining to the region 101c shown in FIG. 3(B) and an image (short-distance image) for the wide-angle short distance pertaining to the region 101d shown in FIG. 3(B).

The allocated resource changing unit 13 analyzes the traveling environment information, determines priorities for the far object recognition unit 14 and the near object recognition unit 15 on the basis of the traveling environment information, and allocates resources used in each processing cycle in objection recognition processing (in other words, the magnitudes of the resources to be allocated are determined) (the details thereof will be described later).

According to the resources allocated by the allocated resource changing unit 13, in each processing cycle, the far object recognition unit 14 recognizes a solid object in images on the basis of the three-dimensional distance image and the long-distance image for the long distance (three-dimensional long-distance data) generated the three-dimensional distance image generation unit 12 and transmits information of the recognized solid object to the control application processing unit 16.

According to the resources allocated by the allocated resource changing unit 13, in each processing cycle, the near object recognition unit 15 recognizes a solid object in images on the basis of the three-dimensional distance image and the short-distance image for the short distance (three-dimensional wide-angle short-distance data) generated by the three-dimensional distance image generation unit 12 and transmits information of the recognized solid object to the control application processing unit 16.

In the present specification, "object recognition processing" means processing in which at least the following tasks are executed.

Task 1: detection of target object (position in three-dimensional space)

Task 2: calculation of speed/quickness of target object

Task 3: classification of target objects (for example, automobile/vehicle, two-wheeled vehicle, bicycle, pedestrian, guardrail, traffic sign, traffic signal, telephone pole, and the like)

According to the solid objects recognized by the far object recognition unit 14 and the near object recognition unit 15, the control application processing unit 16 determines a control application (control operation) executed by a device (the vehicle or the like) on which the information processing apparatus 1 is mounted.

Next, the case where the information processing apparatus 1 is applied as a system for monitoring a surrounding portion of a vehicle V will be described with reference to FIGS. 2 and 3.

Figure 2:
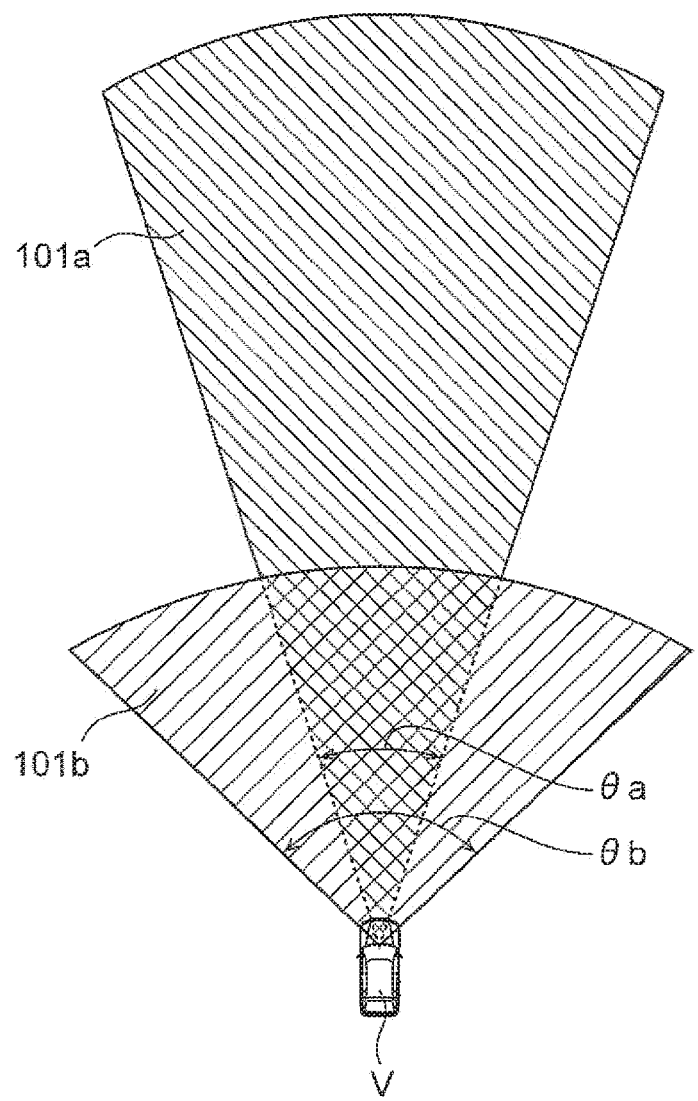
FIG. 2 is a plan view showing a recognition region covered by each camera shown in FIG. 1.

FIG. 2 shows a visual field (object recognition region) of each of the cameras 11a and 11b mounted on the vehicle V. The camera 11a has a far recognition region 101a with a visual angle θa. By processing the image obtained by the camera 11a, it is possible to recognize an object existing in a region (region separated by a predetermined distance from the vehicle V) outside the far recognition region 101a in particular with high precision. In addition, the camera 11b has a wide-angle near recognition region 101b with a visual angle θb (>θa). By processing the image obtained by the camera 11b, it is possible to recognize an object existing in the wide-angle near recognition region 101b (region from the vehicle V to a predetermined distance) with high precision.

FIG. 3 shows a situation where the vehicle V equipped with the information processing apparatus 1 shown in FIG. 1 is in the vicinity of an intersection.

FIG. 3(A) is an overhead view when a pedestrian PA and a vehicle VA are in a visual field of (the cameras 11a and 11b of) the information processing apparatus 1. Here, a situation where the pedestrian PA is in the wide-angle near recognition region 101b and the vehicle VA is in the far recognition region 101a is shown.

In addition, FIG. 3(B) shows that the situation described above is displayed by the images acquired by the cameras 11a and 11b. The region 101c corresponds to the far recognition region 101a and the region 101d corresponds to the wide-angle near recognition region 101b. In this case, the vehicle VA in the region 101c can be recognized as the "vehicle" by the information obtained from the camera 11a and the pedestrian PA in the region 101d can be recognized as the "pedestrian" by the information obtained from the camera 11b.

Next, processing executed by the allocated resource changing unit 13 in the information processing apparatus 1, which is a characteristic part of the present invention, will be specifically described with reference to FIGS. 4 to 6.

Figure 4:
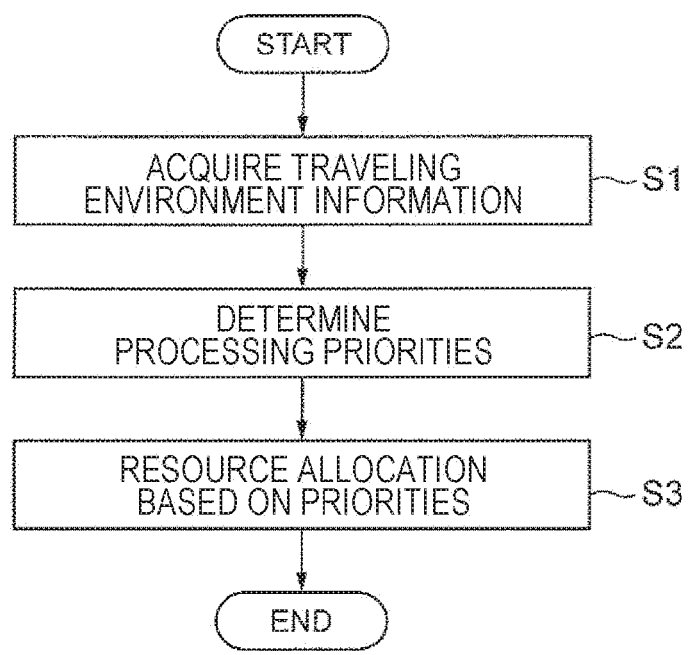
FIG. 4 is a flowchart illustrating resource allocation processing executed by an allocated resource changing unit shown in FIG. 1.

FIG. 4 is a flowchart illustrating resource allocation processing executed by the allocated resource changing unit 13 shown in FIG. 1. In addition, FIG. 5 is a flowchart illustrating processing executed in a processing priority determination step S2 shown in FIG. 4 and FIG. 6 is a flowchart illustrating processing executed in a resource allocation step S3 shown in FIG. 4.

As shown in FIG. 4, the allocated resource changing unit 13 first collects information (data) regarding a current environment in which the vehicle equipped with the information processing apparatus 1 travels, in a traveling environment information acquisition step S1. The traveling environment information (data) includes at least road shape data consisting of a road type (for example, a general road, an intersection, an expressway, a junction, and the like) and road features (for example, a road size, a lane size, a lane number, and the like), object recognition data (consisting of a position, a speed, and a direction of a detected target object with respect to the vehicle equipped with the information processing apparatus 1), and own vehicle data (consisting of a speed, a steering wheel angle, and a system during an operation). The road shape data can be obtained using various methods such as image analysis (for example, analysis of the images obtained by the cameras 11a and 11b), a navigation system (map), and road-to-vehicle communication.

Next, in a processing priority determination step S2, the allocated resource changing unit 13 uses the road shape data, the object recognition data, and the own vehicle data collected in the traveling environment information acquisition step S1 to calculate weights of the priorities for the far object recognition processing by the far object recognition unit 14 and the near object recognition processing by the near object recognition unit 15.

Figure 5:
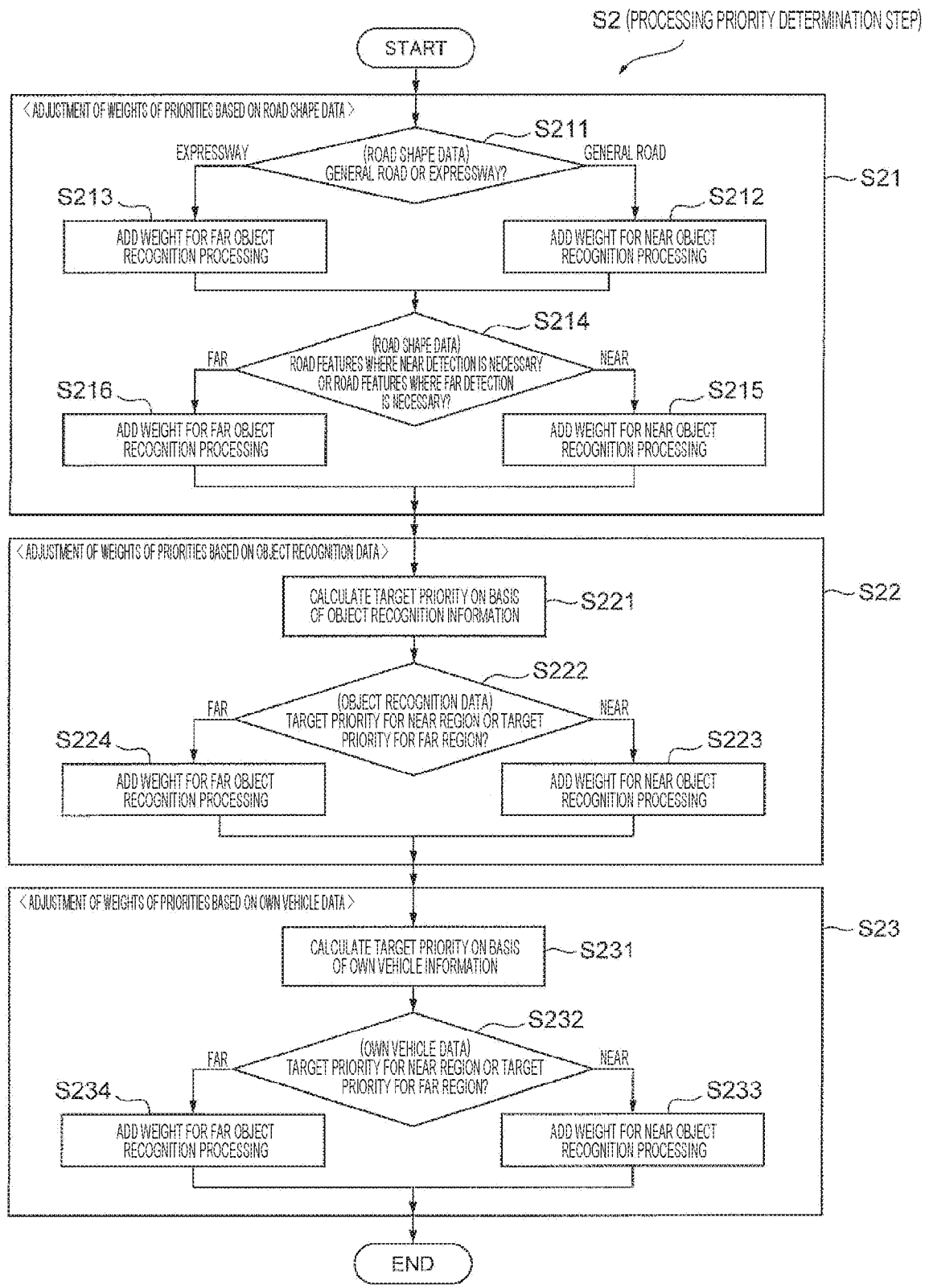
FIG. 5 is a flowchart illustrating processing executed in a processing priority determination step shown in FIG. 4.

Specifically, as shown in FIG. 5, first, in step S21, the weights of the priorities are partially adjusted using the road shape data.

More specifically, it is determined whether the vehicle travels on a general road (including an intersection) or travels on an expressway (step S211). When the vehicle travels on the general road (including the intersection), the weight of the priority for the near object recognition processing is added (step S212) and when the vehicle travels on the expressway, the weight of the priority for the far object recognition processing is added (step S213). In addition, the processing (near object recognition processing or far object recognition processing) of which the weight is to be added is determined by analyzing the road features (step S214). When the near object recognition processing is more important from the road features (for example, a narrow road, a crosswalk, and the like), the weight of the priority for the near object recognition processing is added (step S215). When the far object recognition processing is more important from the road features (for example, a lane number, a wide road, and the like), the weight of the priority for the far object recognition processing is added (step S216).

Next, in step S22, the weights of the priorities are partially adjusted using the object recognition data.

More specifically, using the object recognition data, a target priority is calculated to give the higher priority to a region where the number of objects moving toward the vehicle equipped with the information processing apparatus 1 is large, a region where one or more objects move at a high speed toward the vehicle, a region where the number of objects is large when all objects move away from the vehicle, or a near region when no object is recognized in the current traveling environment (step S221). In addition, it is determined whether the target priority is a target priority for the near region or a target priority for the far region (step S222). When the target priority is the target priority for the near region, the weight of the priority for the near object recognition processing is added (on the basis of the target priority) (step S223). When the target priority is the target priority for the far region, the weight of the priority for the far object recognition processing is added (on the basis of the target priority) (step S224).

In step S23, the weights of the priorities are partially adjusted using the own vehicle data.

More specifically, using the own vehicle data, a new target priority is calculated to give the higher priority to a near region when the traveling speed of the vehicle is lower than a predetermined threshold, a far region when the traveling speed of the vehicle is higher than the predetermined threshold, the near region when the steering wheel angle is larger than a predetermined threshold, the far region when the steering wheel angle is smaller than the predetermined threshold, or the near region when a blinker operates (step S231). In addition, it is determined whether the new target priority is the target priority for the near region or the target priority for the far region (step S232). When the new target priority is the target priority for the near region, the weight of the priority for the near object recognition processing is added (on the basis of the target priority) (step S233). When the new target priority is the target priority for the far region, the weight of the priority for the far object recognition processing is added (on the basis of the target priority) (step S234).

It goes without saying that the order of steps S21, S22, and S23 in the processing priority determination step S2 described above is random order and only one or two of steps S21, S22, and S23 may be executed and the weight of the priority may be calculated.

After calculating the weights of the priorities for the far object recognition processing and the near object recognition processing as described above, as shown in FIG. 4, in the resource allocation step S3 based on the priorities, the allocated resource changing unit 13 uses the weights of the priorities calculated in the processing priority determination step S2 to adjust allocation of the resources to the far object recognition processing and the near object recognition processing (that is, the allocated resource changing unit 13 adjusts the magnitudes of the resources allocated to the far object recognition processing and the near object recognition processing).

Specifically, as shown in FIG. 6, first, in step S31, using the weights of priorities calculated in the processing priority determination step S2 shown in FIG. 4, it is determined whether the priority for the near object recognition processing is high or the priority for the far object recognition processing is high. When the priority for the near object recognition processing is high, in step S32, the resources are allocated to the near object recognition processing (that is, the near object recognition unit 15) such that the near object recognition processing is executed in all processing cycles and in step S33, the resources are allocated to the far object recognition processing (that is, the far object recognition unit 14) such that the far object recognition processing is executed over an interval of the processing cycles according to the weight of the priority. On the other hand, when the priority for the far object recognition processing is high, in step S34, the resources are allocated to the far object recognition processing (that is, the far object recognition unit 14) such that the far object recognition processing is executed in all processing cycles and in step S35, the resources are allocated to the near object recognition processing (that is, the near object recognition unit 15) such that the near object recognition processing is executed over an interval of the processing cycles according to the weight of the priority.

Here, the resource allocation and the adjustment of the interval length of the processing cycles for the object recognition processing (in step S33, the far object recognition processing and in step S35, the near object recognition processing) with the low priority in step S33 and step S35 are performed as follows. That is, when the weight of the priority decreases as compared with the object recognition processing with the high priority, the resources allocated to the processing are reduced. As a result, the processing is distributed at a larger interval of the processing cycles. On the other hand, if the weight of the priority for the processing with the low priority increases, the magnitudes of the allocated resources increase until the processing becomes the processing with the high priority and the processing is distributed at an interval of two processing cycles (in this configuration, an interval of processing cycles considered to be the shortest interval for the processing with the relatively low priority).

The processing executed by the allocated resource changing unit 13 starts when any one of the following conditions is satisfied.

Condition 1: when system activation is completed

Condition 2: when the object recognition processing executed by both the far object recognition unit 14 and the near object recognition unit 15 is completed Condition 3: when an object detection task (corresponding to the task 1) is completed from the object recognition processing executed by both the far object recognition unit 14 and the near object recognition unit 15 (in the case where a difference between the weights of the priorities of the far object recognition processing and the near object recognition processing is less than a predetermined threshold)

However, only when the system is activated, the object recognition processing executed by the far object recognition unit 14 and the near object recognition unit 15 has the same priority and has the same resource allocation to collect the data requested by the allocated resource changing unit 13.

As described above, the far object recognition unit 14 and the near object recognition unit 15 recognize the solid object in the image in each processing cycle, according to (the magnitudes of) the resources allocated by the allocated resource changing unit 13. As a result, the far object recognition unit 14 and the near object recognition unit 15 can monitor both the near and far regions suitably and efficiently and can reduce non-recognition rates of objects (candidate target objects) in both the near and far regions.

Hereinafter, processing executed by allocated resource changing unit 13 in the information processing apparatus 1 when the vehicle V equipped with the information processing apparatus 1 travels in a real environment will be more specifically described with reference to FIGS. 7 to 9.

<Situation Where Vehicle Approaches Intersection of General Road at Low Speed>

Figure 7A:
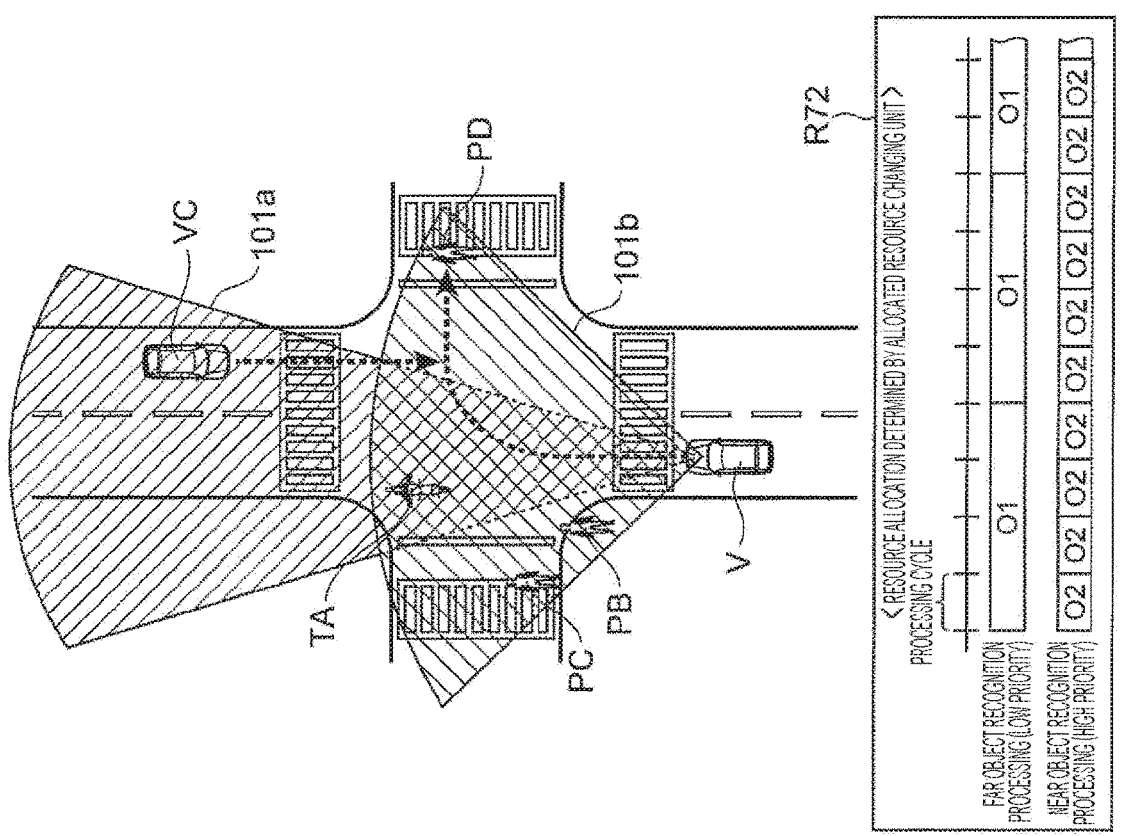
FIGS. 7A and 7B are overhead views showing a situation where the vehicle equipped with the information processing apparatus shown in FIG. 1 approaches an intersection.
Figure 7B:
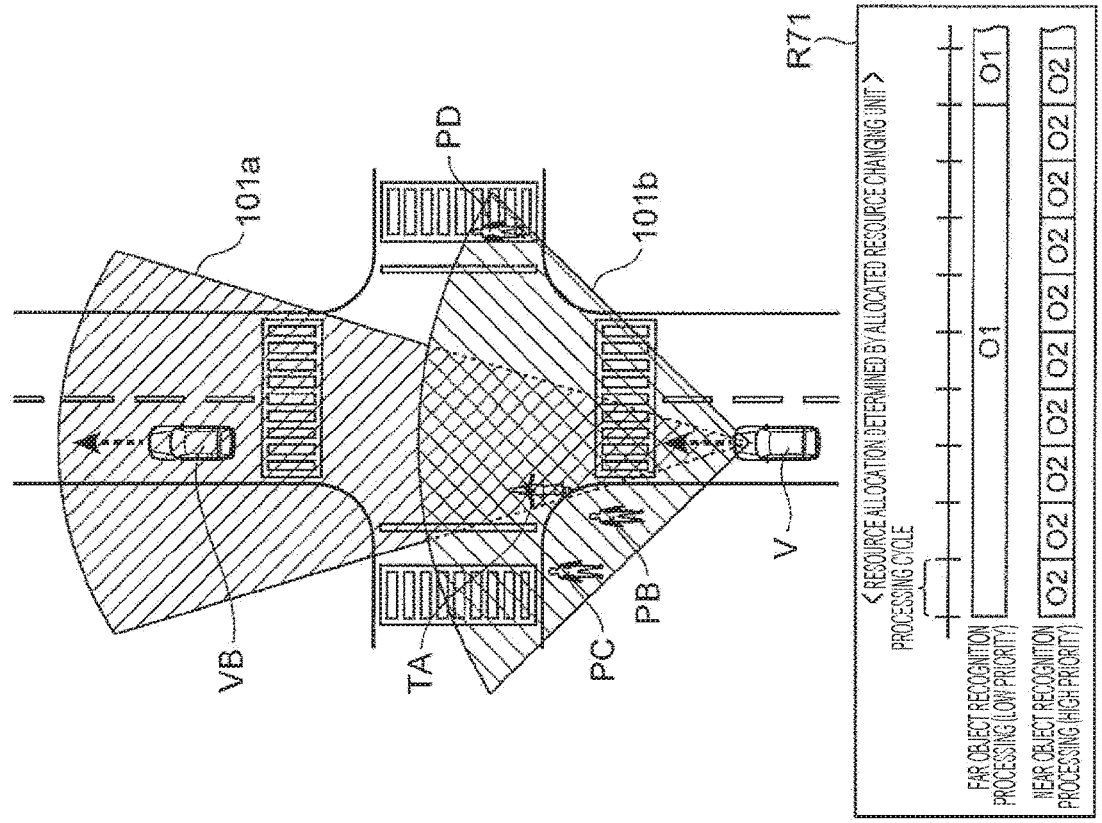

FIG. 7 shows a situation where the vehicle V equipped with the information processing apparatus 1 approaches an intersection of a general road at a low speed, FIG. 7(A) shows a situation where the vehicle V is a little before the intersection, and FIG. 7(B) shows a situation where the vehicle V approaches the intersection and turns right.

In this specific case, a shape of the intersection can be estimated from the image data acquired by the camera 11*b* covering the wide-angle near recognition region 101*b*. However, the shape of the intersection can be obtained from other mechanism such as a navigation system (map), for example.

In the situation shown in FIG. 7(A), a pedestrian PB, a pedestrian PC, a pedestrian PD, and a two-wheeled vehicle TA exist in the wide-angle near recognition region 101*b* and as a result, these are recognized by the near object recognition unit 15. A vehicle VB moving in the same direction as the vehicle V exists in the far recognition region 101*a* and as a result, this is recognized by the far object recognition unit 14. The allocated resource changing unit 13 determines resource allocation R71 shown in FIG. 7(A) according to the processing flow shown in FIG. 4, on the basis of the current traveling environment described above. This resource allocation R71 includes processing priorities and allocated resources used by the far object recognition unit 14 and the near object recognition unit 15.

Here, the resource allocation R71 used in a series of processing cycles until the traveling environment changes has near object recognition processing O2 with a high priority regarding resource allocation to execute the near object recognition processing O2 in all processing cycles. In addition, the resource allocation R71 has far object recognition processing O1 with a low priority regarding partial resource allocation and as a result, the far object recognition processing O1 is distributed and executed over an interval of processing cycles (here, an interval of nine processing cycles) determined on the basis of the weights of the priorities calculated by the allocated resource changing unit 13.

When the object recognition processing (with the low priority) is distributed and executed over an interval of processing cycles determined on the basis of the weights of the priorities, the object recognition processing is divided into individual recognitions (individual applications) such as detection of the target object, recognition of the vehicle, recognition of the pedestrian, recognition of the traffic sign, and recognition of the traffic signal and the individual recognitions are performed in an appropriate processing cycle (processing timing) in the interval of the processing cycles. However, it goes without saying that an image used for each recognition may be an image obtained in a first processing cycle in the interval of the processing cycles, may be an image obtained in the processing cycle (processing timing) to perform each recognition, or may be an image obtained in other processing cycle.

In the situation shown in FIG. 7(B), the vehicle V continuously moves toward the intersection of the general road at a low speed and the pedestrian PB, the pedestrian PC, the pedestrian PD, and the two-wheeled vehicle TA still remain in the wide-angle near recognition region 101*b* and as a result, these are recognized by the near object recognition unit 15. Meanwhile, a vehicle VC (vehicle traveling on an opposite lane) moving in a direction opposite to the vehicle V enters the far recognition region 101*a* and as a result, this is recognized by the far object recognition unit 14. The allocated resource changing unit 13 determines resource allocation R72 shown in FIG. 7(B) according to the processing flow shown in FIG. 4, on the basis of the current traveling environment described above.

Here, the resource allocation R72 used in a series of processing cycles until the traveling environment changes has the near object recognition processing O2 with a high priority regarding resource allocation to execute the near object recognition processing O2 in all processing cycles. The resource allocation R72 has the far object recognition processing O1 with a low priority regarding partial resource allocation and a priority higher than the priority calculated for the resource allocation R71 due to the speed and the movement direction of the vehicle VC with respect to the vehicle V. As a result, the far object recognition processing O1 is distributed and executed over a shorter interval of processing cycles (here, an interval of four processing cycles) determined on the basis of the weights of the priorities calculated by the allocated resource changing unit 13 (in step S22 in the processing priority determination step S2 shown in FIG. 5).

<Situation Where Vehicle Approaches Junction of Expressway at High Speed>

Figure 8B:
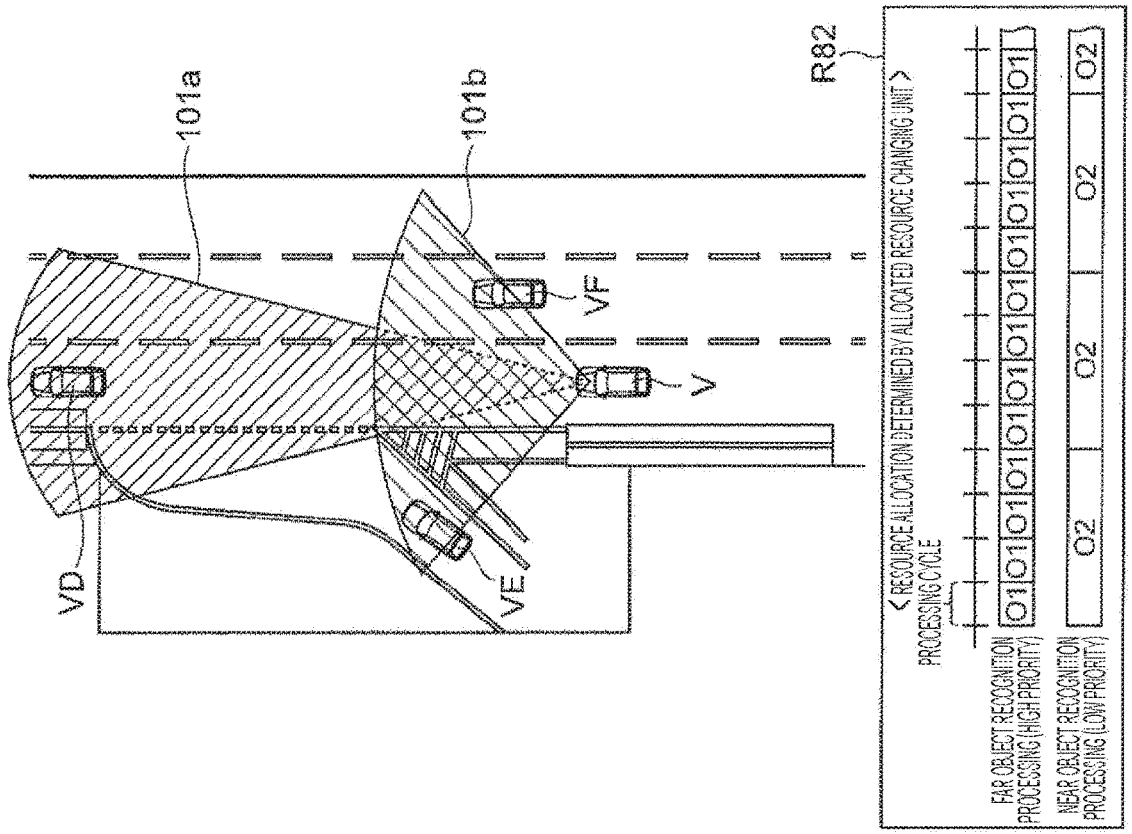
FIGS. 8A and 8B are overhead views showing a situation where the vehicle equipped with the information processing apparatus shown in FIG. 1 and traveling on an expressway approaches a junction.
Figure 8A:
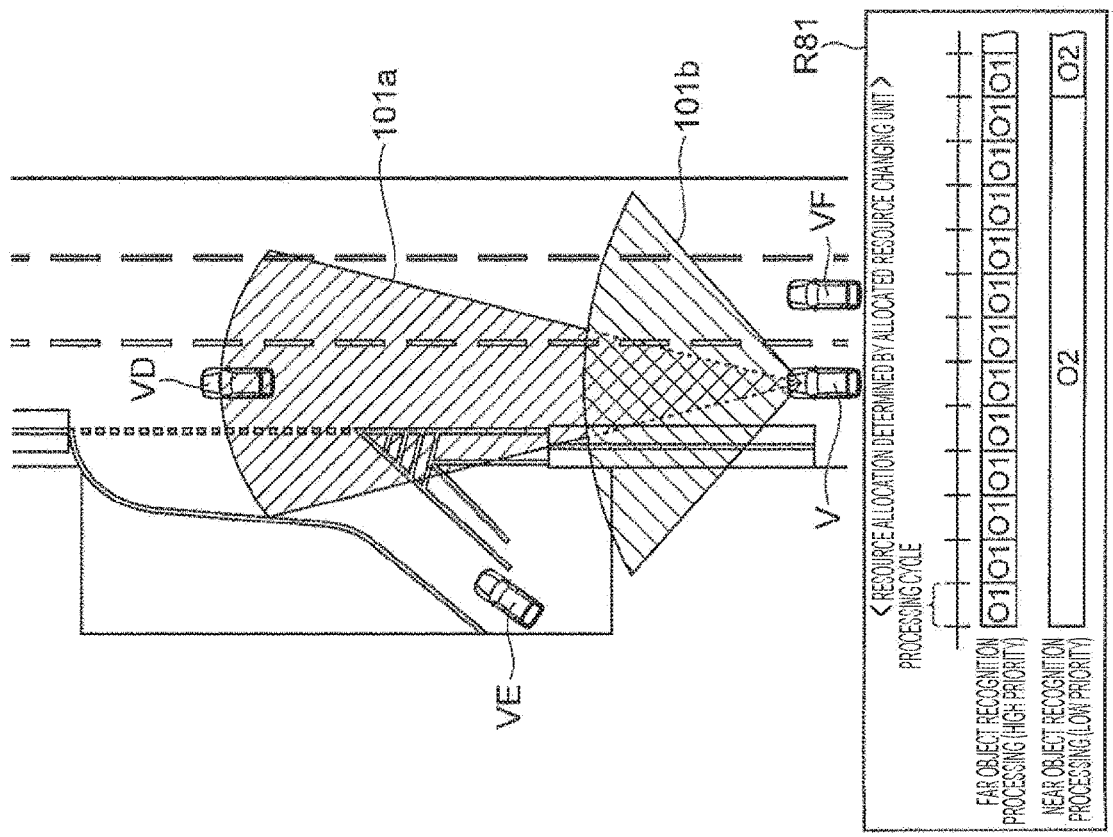

FIG. 8 shows a situation where the vehicle V equipped with the information processing apparatus 1 approaches a junction of an expressway at a high speed, FIG. 8(A) shows a situation where the vehicle V is a little before the junction, FIG. 8(B) shows a situation where the vehicle V approaches the junction.

In this specific case, a shape and a position of the junction can be estimated from the image data acquired by the camera 11*a* covering the far recognition region 101*a*. However, the shape and the position of the junction can be obtained from other mechanism such as a navigation system (map), for example.

In the situation shown in FIG. 8(A), the vehicle VD (vehicle traveling on the same lane as the traveling lane of the vehicle V) moving in the same direction as the vehicle V (vehicle traveling on a lane closer to a merging road in the expressway) exists in the far recognition region 101*a* and as a result, this is recognized by the far object recognition unit 14. However, a vehicle VE (vehicle traveling on the merging road) and a vehicle VF (vehicle traveling on a lane adjacent to the traveling lane of the vehicle V) are out of regions covered by the far recognition region 101*a* and the wide-angle near recognition region 101*b* (that is, the vehicle VE and the vehicle VF are not recognized by the far object recognition unit 14 and the near object recognition unit 15). The allocated resource changing unit 13 determines resource allocation R81 shown in FIG. 8(A) according to the processing flow shown in FIG. 4, on the basis of the current traveling environment described above.

Here, the resource allocation R81 used in a series of processing cycles until the traveling environment changes has the far object recognition processing O1 with a high priority regarding resource allocation to execute the far object recognition processing O1 in all processing cycles. In addition, the resource allocation R81 has the near object recognition processing O2 with a low priority regarding partial resource allocation and as a result, the near object recognition processing O2 is distributed and executed over an interval of processing cycles (here, an interval of twelve processing cycles) determined on the basis of the weights of the priorities calculated by the allocated resource changing unit 13.

In the situation shown in FIG. 8(B), the vehicle V continuously moves toward the junction at a high speed and the vehicle VD moving in the same direction as the vehicle V still remains in the far recognition region 101*a* and as a result, this is recognized by the far object recognition unit 14. Meanwhile, the vehicle approaching (an exit of) the junction from the merging road and the vehicle VF moving in the same direction as the vehicle V on the lane adjacent to the traveling lane of the vehicle V enter the wide-angle near recognition region 101*b* and as a result, these are recognized by the near object recognition unit 15. The allocated resource changing unit 13 determines resource allocation R82 shown in FIG. 8(B) according to the processing flow shown in FIG. 4, on the basis of the current traveling environment described above.

Here, the resource allocation R82 used in a series of processing cycles until the traveling environment changes has the far object recognition processing O1 with a high priority regarding resource allocation to execute the far object recognition processing O1 in all processing cycles. In addition, the resource allocation R82 has the near object recognition processing O2 with a low priority regarding partial resource allocation and a priority higher than the priority calculated for the resource allocation R81 when the vehicle V approaches the vehicle VE and the vehicle VF entering (the exit of) the junction or the wide-angle near recognition region 101*b*. As a result, the near object recognition processing O2 is distributed and executed over a shorter interval of processing cycles (here, an interval of four processing cycles) determined on the basis of the weights of the priorities calculated by the allocated resource changing unit 13 (in step S22 in the processing priority determination step S2 shown in FIG. 5).

<Situation where Vehicle Enters Expressway at Low Speed Via Junction>

Figure 9A:
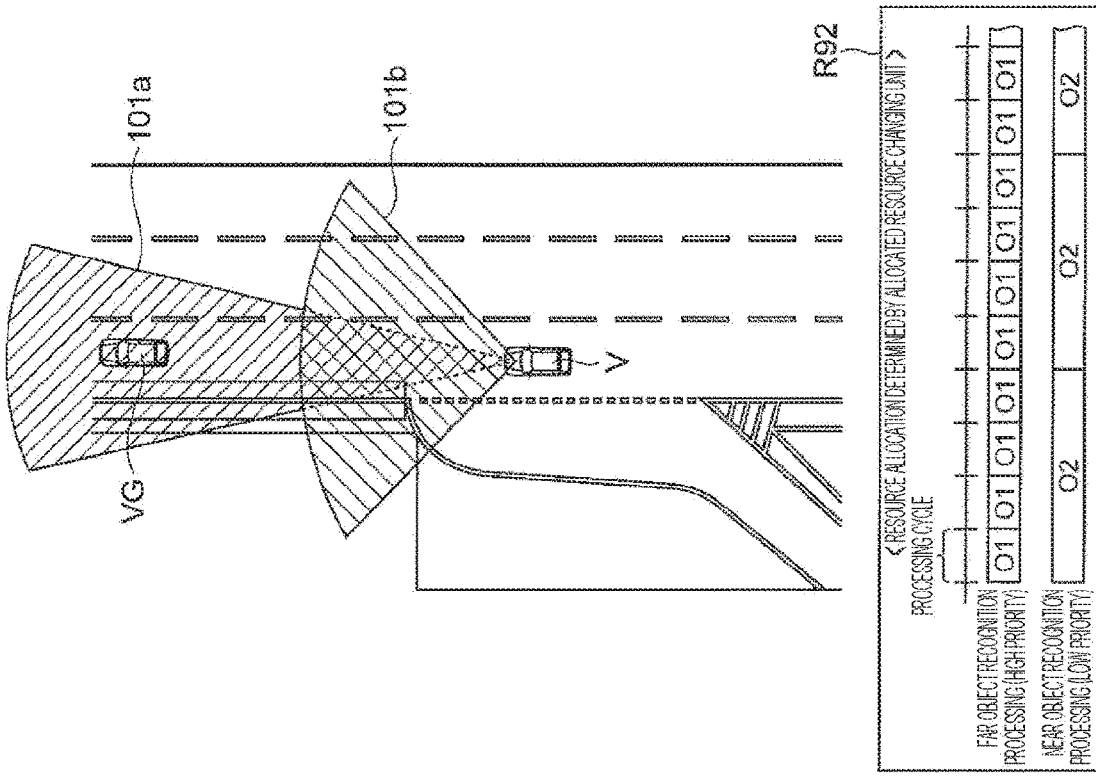
FIGS. 9A and 9B are overhead views showing a situation where the vehicle equipped with the information processing apparatus shown in FIG. 1 enters an expressway via a junction.
Figure 9B:
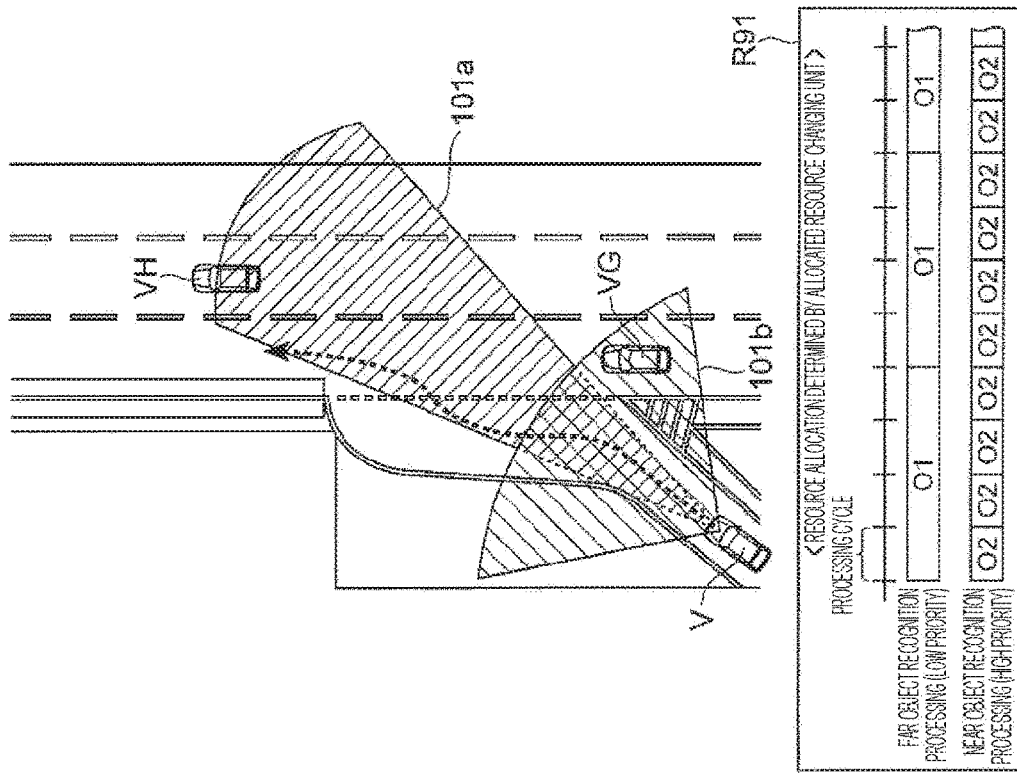

FIG. 9 shows a situation where the vehicle V equipped with the information processing apparatus 1 enters the expressway at a low speed via the junction, FIG. 9(A) shows a situation before the vehicle V joins the expressway, FIG. 9(B) shows a situation after the vehicle V joins the expressway.

In this specific case, shapes and positions of the junction and the expressway can be estimated from the image data acquired by the cameras 11*a* and 11*b*. However, the shapes and the positions of the junction and the expressway can be obtained from other mechanism such as a navigation system (map), for example.

In the situation shown in FIG. 9(A), a vehicle VG (vehicle traveling on a lane closer to a merging road in the expressway) that travels on the expressway and approaches (the exit of) the junction exists in the wide-angle near recognition region 101*b* and as a result, this is recognized by the near object recognition unit 15. A vehicle VH (vehicle traveling on a lane adjacent to a traveling lane of the vehicle VG) that travels on the expressway exists in the far recognition region 101*a* and as a result, this is recognized by the far object recognition unit 14. The allocated resource changing unit 13 determines resource allocation R91 shown in FIG. 9(A) according to the processing flow shown in FIG. 4, on the basis of the current traveling environment described above.

Here, the resource allocation R91 used in a series of processing cycles until the traveling environment changes has the near object recognition processing O2 with a high priority regarding resource allocation to execute the near object recognition processing O2 in all processing cycles. In addition, the resource allocation R91 has far object recognition processing O1 with a low priority regarding partial resource allocation and as a result, the far object recognition processing O1 is distributed and executed over an interval of processing cycles (here, an interval of four processing cycles) determined on the basis of the weights of the priorities calculated by the allocated resource changing unit 13.

In the situation shown in FIG. 9(B), the vehicle V increases its speed and enters the expressway from the merging road and the vehicle VG moving in the same direction as the vehicle V exists in the far recognition region 101*a* and as a result, this is recognized by the far object recognition unit 14. Meanwhile, at a current point of time, there is no other object in the wide-angle near recognition region 101*b* (that is, there is no object recognized by the near object recognition unit 15). The allocated resource changing unit 13 determines resource allocation R92 shown in FIG. 9(B) according to the Processing flow shown in FIG. 4, on the basis of the current traveling environment described above.

Here, because the vehicle V increases its speed and already travels on the expressway, the resource allocation R92 used in a series of processing cycles until the traveling environment changes has the far object recognition processing O1 with a high priority regarding resource allocation to execute the far object recognition processing O1 in all processing cycles. In addition, the resource allocation R92 has the near object recognition processing O2 with a low priority regarding partial resource allocation and as a result, the near object recognition processing O2 is distributed and executed over an interval of processing cycles (here, an interval of four processing cycles) determined on the basis of the weights of the priorities calculated by the allocated resource changing unit 13 (in step S22 in the processing priority determination step S2 shown in FIG. 5).

As described above, according to the information processing apparatus 1 according to this embodiment, the allocated resource changing unit 13 analyzes the current traveling environment and dynamically (regularly) allocates the resources to the near object recognition processing by the near object recognition unit 15 and the far object recognition processing by the far object recognition unit 14, on the basis of traveling environment (dynamically changes the magnitudes of the resources allocated to the near object recognition processing and the far object recognition processing). In particular, even when the priority of the near object recognition processing (near information processing) is higher than the priority of the far object recognition processing (far information processing), the resources of the magnitudes determined according to the priority are allocated to the far object recognition unit (far information processing unit) 14. Therefore, both the near and far regions covered by the cameras 11*a* and 11*b* can be monitored suitably and efficiently while the processing load of the object recognition processing is suppressed and the non-recognition rates of the objects (candidate target objects) in both the near and far regions can be reduced. As a result, traveling safety can be improved.

[Modification of Processing Executed by Allocated Resource Changing Unit 13]

In the embodiment, the allocated resource changing unit 13 changes the magnitudes of the resources allocated to the far object recognition unit 14 and the near object recognition unit 15 according to the priorities of the far object recognition processing and the near object recognition processing, thereby changing the processing frequency or the processing cycle (specifically, the interval of the processing cycles for executing the object recognition processing) of the object recognition processing in the far object recognition unit 14 and the near object recognition unit 15. However, for example, the allocated resource changing unit 13 may divide the tasks of the object recognition processing in the far object recognition unit 14 and the near object recognition unit 15 by allocating the resources (changing the magnitudes of the allocated resources). In this case, the processing frequency or the processing cycle of the object recognition processing in the far object recognition unit 14 and the near object recognition unit 15 may be the same or different (in an example shown in FIG. 12 to be described later, the object recognition processing in the far object recognition unit 14 and the near object recognition unit 15 is executed in all processing cycles and the processing frequency or the processing cycle thereof is the same).

Hereinafter, the case where tasks of the object recognition processing are divided by allocating resources in the processing executed by the allocated resource changing unit 13 will be specifically described with reference to FIGS. 10 to 12.

Because the other configuration is the same as that in the embodiment, detailed description thereof will be omitted below.

First, as a premise for performing this processing, as described above, the object recognition processing is divided into the following three different tasks, for example.

Task 1: detection of target object (position in three-dimensional space)

Task 2: calculation of speed/quickness of target object

Task 3: classification of target objects (for example, automobile/vehicle, two-wheeled vehicle, bicycle, pedestrian, guardrail, traffic sign, traffic signal, telephone pole, and the like).

The task division performed in this processing is executed in a state in which "calculation of speed/quickness of target object (task 2)" and "classification of target objects (task 3)" can be excluded from the object recognition processing, but "detection of target object (task 1)" must be included.

Figure 10:
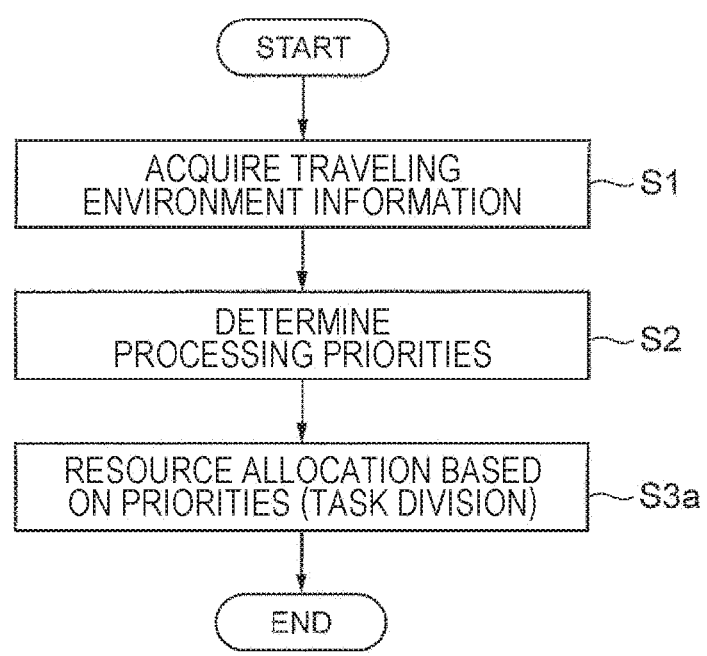
FIG. 10 is a flowchart illustrating resource allocation processing (including task division processing) executed by the allocated resource changing unit shown in FIG. 1.

FIG. 10 is a flowchart illustrating the resource allocation processing (including task division processing) executed by the allocated resource changing unit 13 shown in FIG. 1. In addition, FIG. 11 is a flowchart illustrating processing executed in a resource allocation (task division) step S3*a* shown in FIG. 10.

As shown in FIG. 10, the allocated resource changing unit 13 first collects information (data) regarding a current environment in which the vehicle equipped with the information processing apparatus 1 travels, in a traveling environment information acquisition step S1, similarly to the embodiment.

Next, in a processing priority determination step S2, the allocated resource changing unit 13 calculates the weights of the priorities for the far object recognition processing by the far object recognition unit 14 and the near object recognition processing by the near object recognition unit 15, similarly to the embodiment.

In addition, in a resource allocation (task division) step S3*a* based on the priorities, using the weights of the priorities calculated in the processing priority determination step S2, the allocated resource changing unit 13 adjusts the object recognition tasks executed for the far object recognition processing and the near object recognition processing and adjusts allocation of the resources to the far object recognition processing and the near object recognition processing (that is, the allocated resource changing unit 13 adjusts the magnitudes of the resources allocated to the far object recognition processing and the near object recognition processing).

Figure 11:
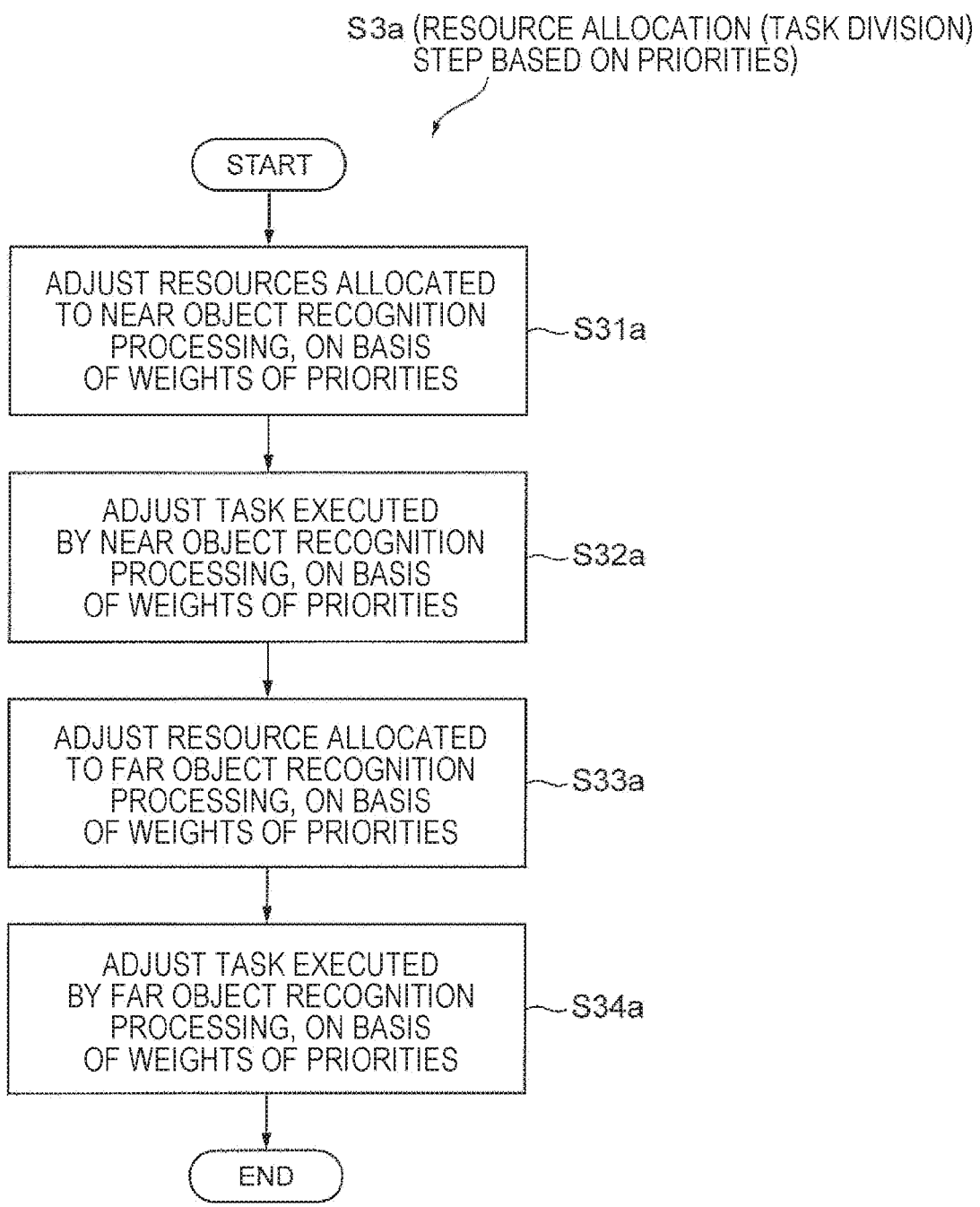
FIG. 11 is a flowchart illustrating processing executed in a resource allocation (task division) step shown in FIG. 10.

Specifically, as shown in FIG. 11, first, in step S31*a*, similarly to the embodiment, using the weights of the priorities calculated in the processing priority determination step S2 shown in FIG. 10, (the magnitudes of) the resources allocated to the near object recognition processing (that is, the near object recognition unit 15) are adjusted such that the near object recognition processing is executed in all processing cycles or over an interval of processing cycles according to the weights of the priorities thereof and in step S32*a*, the object recognition task (the type of the task) executed by the near object recognition processing is adjusted according to the weights of the priorities.

Next, in step S33*a*, similarly to the embodiment, using the weights of the priorities calculated in the processing priority determination step S2 shown in FIG. 10, (the magnitudes of) the resources allocated to the far object recognition processing (that is, the far object recognition unit 14) are adjusted such that the far object recognition processing is executed in all processing cycles or over an interval of processing cycles according to the weights of the priorities thereof and in step S34*a*, the object recognition task (the type of the task) executed by the far object recognition processing is adjusted according to the weights of the priorities.

In this case, the processing executed by the allocated resource changing unit 13 starts when any one of the following conditions is satisfied.

Condition 1: when system activation is completed

Condition 2: when the object recognition processing executed by both the far object recognition unit 14 and the near object recognition unit 15 is completed However, only when the system is activated, the object recognition processing executed by the far object recognition unit 14 and the near object recognition unit 15 has the same priority and has the same resource allocation to collect the data requested by the allocated resource changing unit 13.

As described above, the far object recognition unit 14 and the near object recognition unit 15 detect and recognize the solid object in the image in each processing cycle, according to (the magnitudes of) the resources allocated by the allocated resource changing unit 13. As a result, both the near and far regions can be monitored suitably and efficiently and non-recognition rates of the objects (candidate target objects) in both the near and far regions can be reduced.

Hereinafter, processing executed by the allocated resource changing unit 13 in the information processing apparatus 1 when the vehicle V equipped with the information processing apparatus 1 travels in a real environment in the case where the information processing apparatus 1 is applied as a system for monitoring a surrounding portion of the vehicle V will be more specifically described with reference to FIG. 12.

Figure 12:
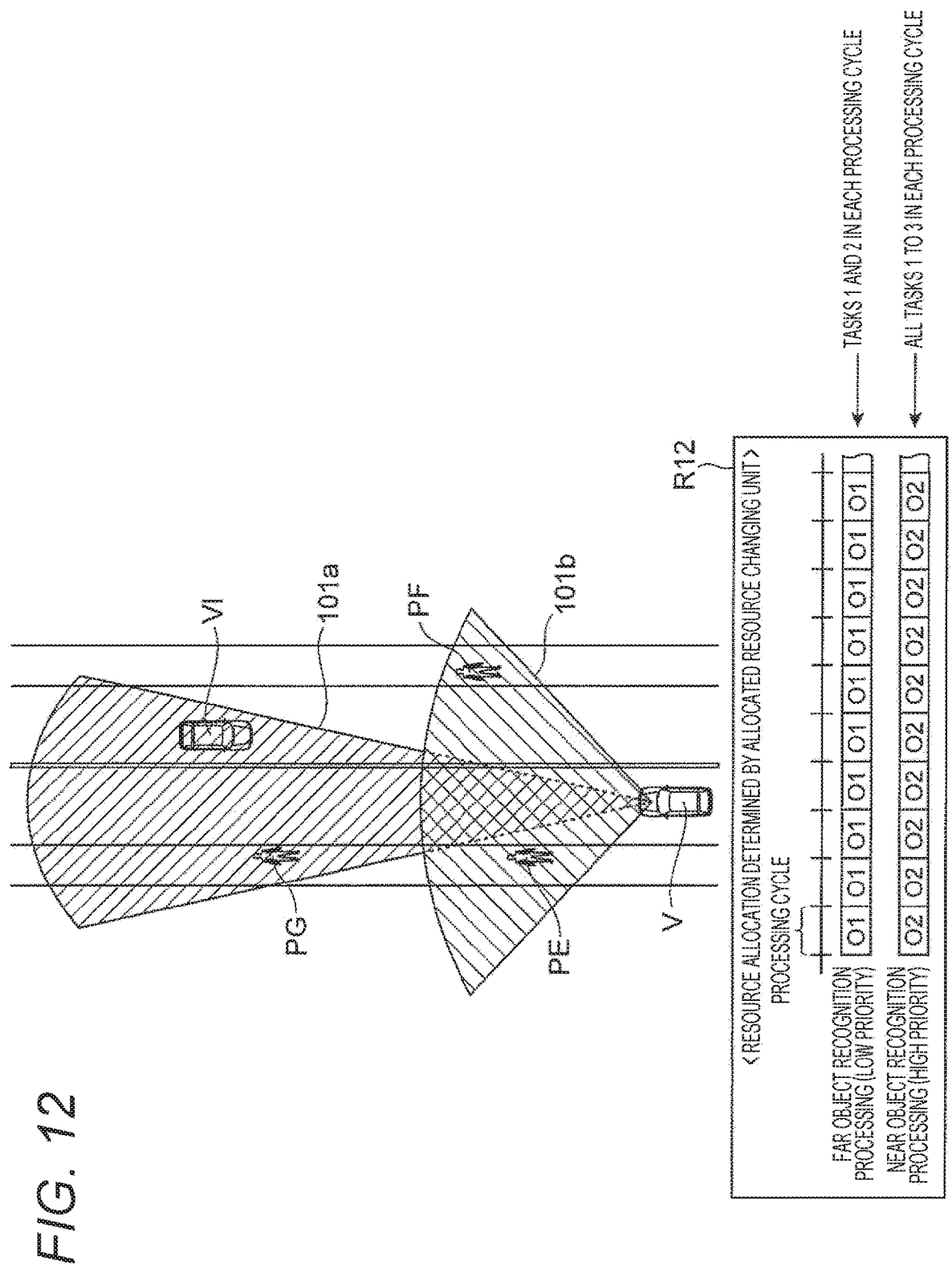
FIG. 12 is an overhead view showing a situation where the vehicle equipped with the information processing apparatus shown in FIG. 1 travels on a general road.

FIG. 12 shows a situation where the vehicle V equipped with the information processing apparatus 1 travels on a general road at a low speed.

In this specific case, a shape of the general road can be estimated from the image data acquired by the cameras 11a and 11b. However, the shape of the general road can be obtained from other mechanism such as a navigation system (map), for example.

In the situation shown in FIG. 12, a pedestrian PE and a pedestrian PF exist in the wide-angle near recognition region 101b and as a result, these are recognized by the near object recognition unit 15. A vehicle VI (vehicle traveling on an opposite lane) moving in a direction opposite to the vehicle V and a pedestrian PG exist in the far recognition region 101a and as a result, these are recognized by the far object recognition unit 14. The allocated resource changing unit 13 determines resource allocation R12 shown in FIG. 12 according to the processing flow shown in FIG. 10, on the basis of the current traveling environment described above.

Here, the resource allocation R12 used in a series of processing cycles has the near object recognition processing O2 with a high priority (priority where all object recognition tasks are executed) regarding resource allocation to execute the near object recognition processing O2 in all processing cycles. In addition, the resource allocation R12 has the far object recognition processing O1 with a low priority (here, a priority where only tasks of "detection of target object (task 1)" and "calculation of speed/quickness of target object (task 2)" are executed in all processing cycles).

According to the information processing apparatus having the above configuration, similarly to the embodiment, the allocated resource changing unit 13 analyzes the current traveling environment and dynamically allocates the resources to the near object recognition processing by the near object recognition unit 15 and the far object recognition processing by the far object recognition unit 14, on the basis of the traveling environment (dynamically changes the magnitudes of the resources allocated to the near object recognition processing and the far object recognition processing) and suitably divides the tasks executed by the near object recognition processing and the far object recognition Processing. Therefore, both the near and far regions covered by the cameras 11a and 11b can be monitored suitably and efficiently while the processing load of the object recognition processing is suppressed and the non-recognition rates of the objects (candidate target objects) in both the near and far regions can be reduced. As a result, traveling safety can be improved.

Figure 13:
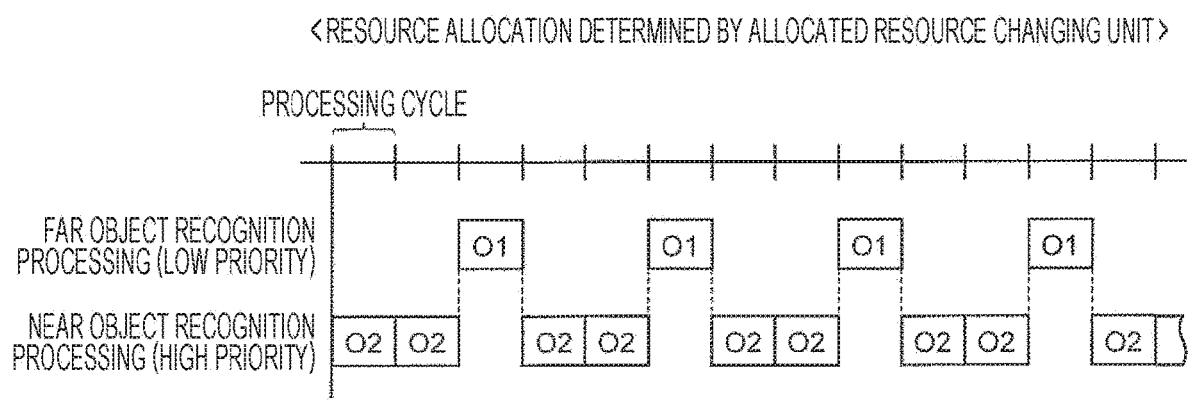
FIG. 13 is a diagram showing another example of resource allocation determined by the allocated resource changing unit.

In the embodiment, to perform the object recognition processing with the relatively high priority with high precision, resource allocation for the object recognition processing with the high priority is performed such that the processing is executed in all processing cycles. However, it is not always necessary to execute the object recognition processing with the high priority in all processing cycles. For example, as shown in FIG. 13, similarly to the resource allocation for the object recognition processing with the low priority, the processing may be executed at an interval of processing cycles according to the weights of the priorities and the object recognition processing with the high priority and the object recognition processing with the low priority may be alternately executed. More specifically, as in an example shown in FIG. 13, the far object recognition processing O1 to be the object recognition processing with the low priority may be executed in one processing cycle after the near object recognition processing O2 to be the object recognition processing with the high priority is executed in two processing cycles and these processing may be repeated.

The present invention is not limited to the embodiments described above and various modifications are included. For example, the embodiments are described in detail to facilitate the description of the present invention and the present invention is not limited to including all of the described configurations. In addition, a part of the configurations of the certain embodiment can be replaced by the configurations of other embodiments or the configurations of other embodiments can be added to the configurations of the certain embodiment. In addition, for a part of the configurations of the individual embodiments, addition/removal/replacement of other configurations can be performed.

A part or all of the individual configurations, functions, processing units, and processing mechanisms may be realized by hardware by designing by an integrated circuit, for example. In addition, the individual configurations and functions may be realized by software by analyzing programs for realizing the functions by a processor and executing the programs by the processor. Information such as a program, a table, and a file that realizes each function can be held in a storage device such as a memory, a hard disk, and a solid state drive (SSD) or a recording medium such as an IC card, an SD card, and a DVD.

In addition, only control lines or information lines necessary for explanation are illustrated and the control lines or information lines do not mean all control lines or information lines necessary for a product. In actuality, almost all configurations may be mutually connected.

REFERENCE SIGNS LIST 11a camera (far information acquisition unit)
11b camera (near information acquisition unit)
12 three-dimensional distance image generation unit
13 allocated resource changing unit
14 far object recognition unit (far information processing unit)
15 near object recognition unit (near information processing unit)

16 control application processing unit
101a far recognition region
101b wide-angle near recognition region

The invention claimed is:

1. An information processing apparatus, comprising:
  a far information acquisition unit which acquires far information regarding a far region;
  a near information acquisition unit which acquires near information regarding a near region;
  a far information processing unit which performs far information processing using the far information;
  a near information processing unit which performs near information processing using the near information; and
  an allocated resource changing unit which changes the magnitudes of resources allocated to the far information processing unit and the near information processing unit, according to priorities of the far information processing and the near information processing,
  wherein the allocated resource changing unit allocates the resources of the magnitudes determined according to the priority to the far information processing unit, even when the priority of the near information processing is higher than the priority of the far information processing.

2. The information processing apparatus according to claim 1, wherein
  the far information processing unit executes detection and/or recognition processing of a far target object of an own vehicle from the far information,
  the near information processing unit executes detection and/or recognition processing of a near target object of the own vehicle from the near information, and
  the far information processing unit executes the detection and/or recognition processing of the far target object of the own vehicle, on the basis of a traveling environment, even when the near target object of the own vehicle is detected and/or recognized by the near information processing unit.

3. The information processing apparatus according to claim 1, wherein the allocated resource changing unit changes a processing frequency of the far information processing unit and a processing frequency of the near information processing unit.

4. The information processing apparatus according to claim 3, wherein the allocated resource changing unit changes the processing frequencies such that the processing frequency of the information processing unit with the low priority in the far information processing unit and the near information processing unit is lower than the processing frequency of the information processing unit with the high priority.

5. The information processing apparatus according to claim 1, wherein the allocated resource changing unit changes a processing cycle of the far information processing unit and a processing cycle of the near information processing unit.

6. The information processing apparatus according to claim 5, wherein the allocated resource changing unit changes the processing cycles such that the processing cycle of the information processing unit with the low priority in the far information processing unit and the near information processing unit is longer than the processing cycle of the information processing unit with the high priority.

7. The information processing apparatus according to claim 1, wherein the allocated resource changing unit changes a task of the far information processing unit and a task of the near information processing unit.

8. The information processing apparatus according to claim 7, wherein the allocated resource changing unit changes the tasks such that the task of the information processing unit with the low priority in the far information processing unit and the near information processing unit is smaller than the task of the information processing unit with the high priority.

9. The information processing apparatus according to claim 1, wherein the allocated resource changing unit determines the priorities of the far information processing and the near information processing, on the basis of the far information and the near information.

10. An information processing apparatus, comprising:
  a far information acquisition unit which acquires far information regarding a far region;
  a near information acquisition unit which acquires near information regarding a near region;
  a far object recognition unit which performs object recognition processing of an object existing in the far region using the far information;
  a near object recognition unit which performs object recognition processing of an object existing in the near region using the near information; and
  an allocated resource changing unit which changes the magnitudes of resources allocated to the far object recognition unit and the near object recognition unit, according to priorities of far object recognition processing of the far region and near object recognition processing of the near region,
  wherein the allocated resource changing unit allocates the resources of the magnitudes determined according to the priority to the far object recognition unit, even when the priority of the near object recognition processing of the near region is higher than the priority of the far object recognition processing of the far region.

* * * * *